UNITED STATES PATENT OFFICE.

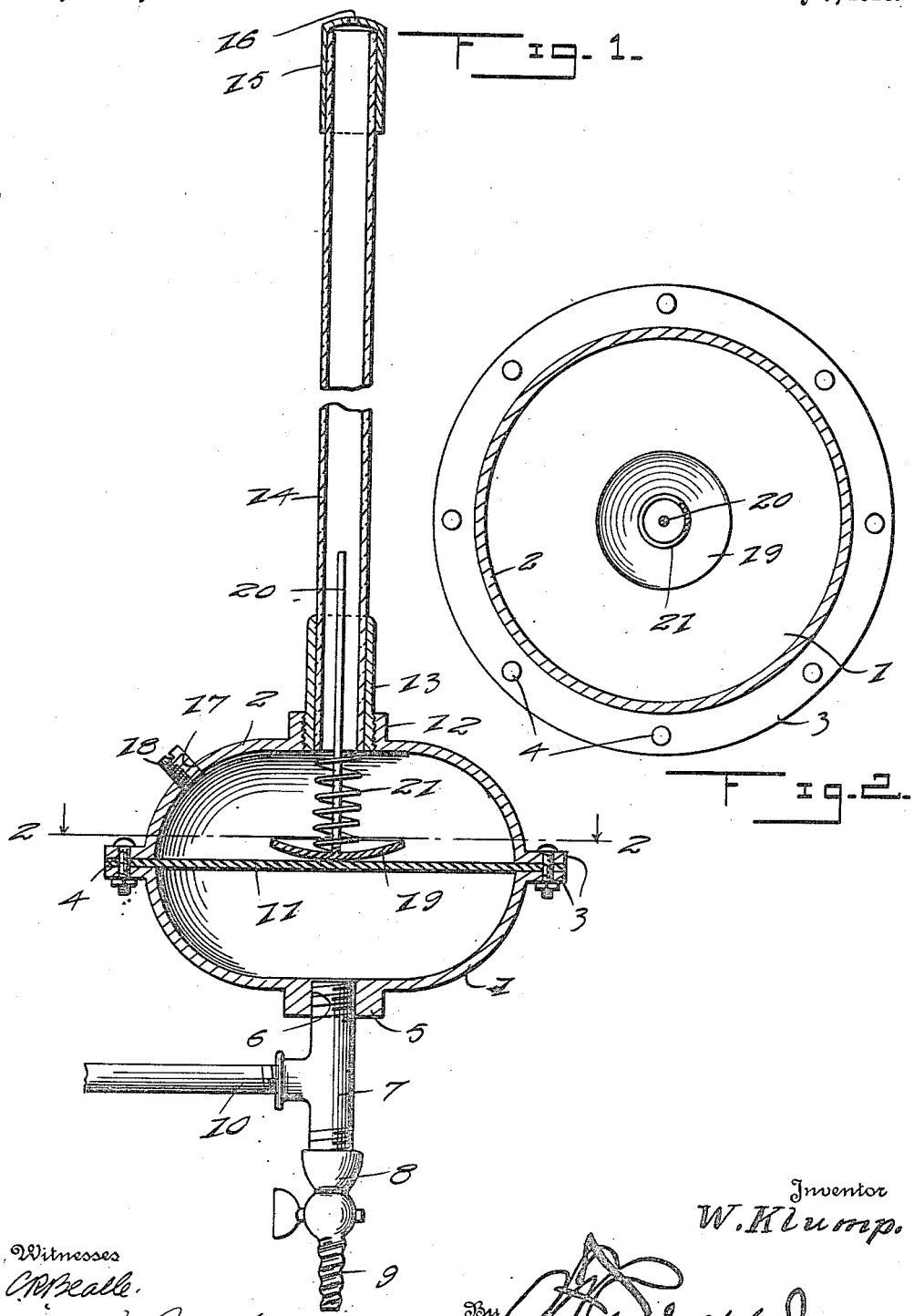

WILLIAM KLUMP, OF EAST ORANGE, NEW JERSEY.

GAGE.

1,265,676.　　　　Specification of Letters Patent.　　Patented May 7, 1918.

Application filed December 20, 1916. Serial No. 137,988.

*To all whom it may concern:*

Be it known that I, WILLIAM KLUMP, a citizen of the United States, residing at East Orange, in the county of Essex and State of New Jersey, have invented certain new and useful Improvements in Gages; and I do hereby declare the following to be a full, clear, and exact description of the invention, such as will enable others skilled in the art to which it appertains to make and use the same.

This invention relates to new and useful improvements in gages and the principal object of the invention is to provide a test gage for testing gas pipes and the like for leaks.

Another object of the invention is to provide a gage which may be used as a pressure gage as well as a test gage.

A still further object of the invention is to provide a gage which is adapted to operate without sliding pistons or similar moving parts where leaks are apt to occur.

A still further object of the invention is to provide a device using a flexible diaphragm which is clamped between two flat faces of the gage thus forming a fluid and liquid tight joint so that the device may be used to readily determine any leakage in the piping system.

With these and other objects in view the invention consists in the novel combination and arrangement of parts which will be fully set forth in the following specification and accompanying drawing, in which:—

Figure 1 is a vertical sectional view through a gage constructed in accordance with this invention, and Fig. 2 is a horizontal sectional view on line 2—2 of Fig. 1.

Referring to the drawing 1 designates one of the sections of the gage body, while the numeral 2 designates the coöperating section. Each of these sections consists of a concavo convex body formed at its edge with flanges 3 which flanges are arranged so that their adjacent faces abut and are provided with openings for the reception of suitable connecting bolts 4 by means of which the sections are clamped together. The lower section is provided with a hollow boss 5 having a relatively small internally threaded aperture 6 arranged therein which aperture communicates with the interior of the device and into which one end of a T-connection 7 is threaded. The opposite end of said T-connection has threaded thereon a stop cock 8 provided with a hose nipple 9 to which the hose of a pump is connected. The central connection of the T 7 is threaded on to a pipe 10 which is the system to be tested and it will be seen that when the stop cock 8 is open and the pump connected to the nipple 9 and operated, air will be forced into the piping system and after a certain amount of air has been forced thereinto the stop cock is closed and the device let stand for a predetermined length of time. A suitable diaphragm preferably of rubber or similar elastic flexible material is designated by the numeral 11 and is clamped between the flanges 3 and it will be seen that as the air is forced into the system the diaphragm will be forced upwardly into the section 2 of the gage.

The section 2 of the gage is formed with an outwardly extending hollow internally threaded boss 12 into which a nipple 13 is threaded which nipple forms a support for the transparent tube 14 which is formed of celluloid or any other suitable material. This tube 14 extends upwardly and is provided at its upper end with a cap 15 having a vent opening 16 arranged centrally thereof and it is seen that the tube 14 communicates with the interior of the gage body. A suitable filling opening 17 is formed in the section 2 of the gage body and is normally closed by a plug 18 and through this filling opening suitable liquid, preferably water, is introduced to the interior of the device from the upper side of the diaphragm.

Resting on the upper side of the diaphragm is a suitable head 19 having extending upwardly therefrom the guide stem 20 which stem projects well up into the tube 14 and is surrounded by a spring 21, the upper end of which abuts the lower end of the tube 14, while the lower end of said spring abuts the head 19 previously referred to. The spring 21 forms a tension on the central portion of the diaphragm 11 so as to make it necessary for a considerable pressure to move the diaphragm 11. The head 19 is of concavo-convex formation and receives the lower end of the spring 21 and serves as a guard for the diaphragm 19 and prevents the spring from wearing out the same. The upwardly extending stem 20 forms a guide for the guard 19 and tends to normally hold the same in the central portion of the diaphragm 11. It will thus be seen that as a diaphragm 11 moves upwardly the stem 20 will rise as will also the liquid contained in the chamber 2. The pressure in the system will be indicated by the height of the liquid column within the tube 14. If any leakage occurs in the system it will be seen that the air leaving the same will allow the diaphragm to gradually return to original position and thus the leakage will be registered by the movement of the upper end of the liquid column when compared with its original position.

It will also be evident that the device may be used as a pressure gage by letting the pipe 10 lead to a pressure tank and it will be evident that the pressure on the lower side of the diaphragm will cause the same to tend to move upwardly into the upper section 2 until it reaches a predetermined point and when the pressure remains stationary, the liquid column will of course, remain stationary but should any fluctuation of pressure occur it will be registered by the relative change of the position of the top of the liquid.

While in the foregoing there has been shown and described the preferred embodiment of this invention, it is to be understood that such changes may be made in the combination and arrangement of parts as will fall within the spirit and scope of the invention as claimed.

What is claimed is:—

1. A gage comprising a hollow body, a diaphragm extending centrally through the body and separating the body into an upper and lower compartment, a tube extending upwardly from one end of the body and communicating with the body, a pipe on the under side of the body adapted for connecting the device to a piping system, a liquid gage element within the body and positioned on the upper side of the diaphragm, a coil spring having one end bearing against the upper side of said diaphragm and the opposite end against the body, a guard receiving the lower end of the spring and positioned between said spring and said diaphragm, and a stem secured to said guard and extending upwardly therefrom into said tube, as and for the purpose specified.

2. A gage comprising a hollow body, a diaphragm extending centrally through the body and separating said body into an upper and lower chamber, a tube extending upwardly from the upper side of the body and communicating with the upper chamber, a pipe on the under side of the body to connect the same to a piping system, a liquid gage element in the upper chamber and resting on the diaphragm, a substantially concavo-convex disk positioned on the upper surface of said diaphragm, an expansion coil spring bearing against said disk and the upper portion of said hollow body, and a guide pin secured to the central portion of said concavo-convex disk and extending upwardly therefrom into said tube to form a guide for said concavo-convex disk.

In testimony whereof I affix my signature in presence of two witnesses.

WILLIAM KLUMP.

Witnesses:
C. W. KING,
GEORGE C. MEISTER.